Dec. 9, 1941.  N. I. STARK  2,265,404
COVER AND FASTENER
Filed June 25, 1938
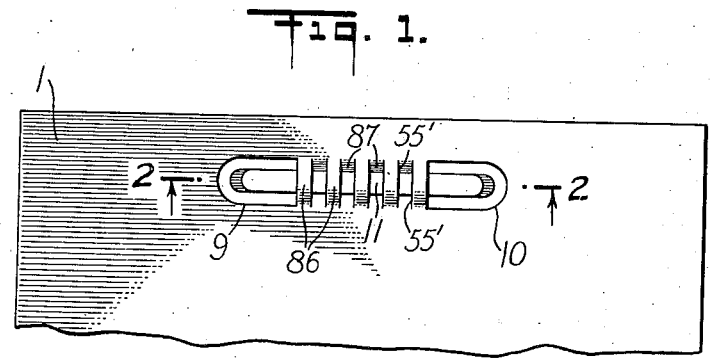
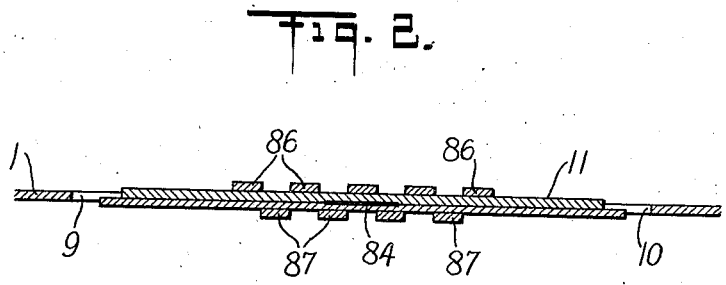
INVENTOR
*Nathan I. Stark*
BY
*Blair, Curtis, Dunne & Hayward*
ATTORNEYS Patented Dec. 9, 1941

2,265,404

UNITED STATES PATENT OFFICE 2,265,404

COVER AND FASTENER

Nathan I. Stark, Jersey City, N. J., assignor to A. J. Amberg Business Equipment Corporation, New York, N. Y., a corporation of New York Application June 25, 1938, Serial No. 215,828

1 Claim. (Cl. 129—25)

This invention relates to a cover or carrier and fastener for papers or the like. Heretofore widely used devices for carrying or filing papers have included sheets of fibrous material fitted with flexible metal retaining clips or fasteners and additional means for securing the fasteners to the sheets. Portions of such additional means as locking devices or base plates, have protruded from the rear face of the sheet and have thus interfered with effective filing and handling, even when patches of cloth or other suitable material are employed to cover the protruding part. Also, such constructions unduly increase the overall thickness of the carrier over the area occupied by the fastener.

One object of the present invention is to provide a simplified cover or carrier of fibrous or other suitable material having a self-securing fastener for papers or the like presenting a minimum of increased overall thickness and with no undue extension beyond the surface of the carrier.

A suitable method of making such a carrier device includes deforming portions of a cover or carrier sheet or base to form clip retaining embossments therein having aligned lateral openings or slits; and then sliding a suitable fastener or clip, such, for example, as a length of pliable metal, successively through said openings to its operative assembled position without bending or distortion of the clip or cover.

A further object has been to provide a carrier of fibrous or other suitable material as paper or cardboard, and a fastener whereby sheets of paper or the like may be retained at either side of the carrier.

Other objects and advantages of the invention will appear from the following description of one embodiment thereof and from the appended drawing.

Figure 1 is a plan view; and

Figure 2, an enlarged fragmentary view in transverse section on the line 2—2 of Figure 1.

The embodiment of my invention illustrated in the drawing includes a carrier sheet 1 preferably of fibrous material, as paper, cardboard or the like, and a suitable fastener or clip preferably a narrow strip of metal such as soft tinned steel or soft brass, which extends through a transverse passageway formed in said carrier sheet 1 by a plurality or series of slits. A substantial portion of said clip is left free at each end thereof to provide prongs.

The carrier sheet 1 is provided with a plurality or series of slits 55' and embossments, as 86 and 87. Said slits and said embossments provide a transverse opening or passageway through which is passed a suitable fastener element, as metal clip 11.

Carrier sheet 1 is also provided with recesses or openings 9 and 10 punched therein at the opposite ends of the series of slits 55' and in position to receive the free ends of clip 11 so that its prongs may be bent outwardly from said openings toward either face of the carrier 1. Where the metal clip comprises two layers, they may be joined together at 84, as by spot welding or soldering, to provide a fastener with two prongs at each end, one prong being shorter than the other.

The product above described provides a filing device which has all the utility of known devices for a similar purpose with the added advantage that it occupies only a small part of the file space and presents no superfluous bases or locking plates protruding from the carrier sheet to interfere with its handling.

I claim:

A carrier or file for papers or the like comprising a carrier sheet provided with a series of separated slits and an opening at each end of said series, and a flexible fastener having mid portions in engagement with said slits and free end portions extending into and normally embraced within said end openings, said ends being deflectable out of said openings to engage papers or the like to retain the same on said carrier.

NATHAN I. STARK.